United States Patent
Kang et al.

(10) Patent No.: US 11,809,203 B2
(45) Date of Patent: Nov. 7, 2023

(54) METHOD AND COMPUTER PROGRAM FOR CONTROLLING TILT ANGLE OF MAIN ROTOR ON BASIS OF PITCH ATTITUDE CONTROL SIGNAL LOW-SPEED FLIGHT STATE, AND VERTICAL TAKE-OFF AND LANDING AIRCRAFT

(71) Applicant: KOREA AEROSPACE RESEARCH INSTITUTE, Daejeon (KR)

(72) Inventors: Youngshin Kang, Daejeon (KR); Am Cho, Daejeon (KR); Seongwook Choi, Daejeon (KR); Yushin Kim, Daejeon (KR); Sung Ho Chang, Sejong (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 741 days.

(21) Appl. No.: 16/872,825

(22) Filed: May 12, 2020

(65) Prior Publication Data
US 2020/0278701 A1 Sep. 3, 2020

Related U.S. Application Data

(63) Continuation of application No. PCT/KR2018/011531, filed on Sep. 28, 2018.

(30) Foreign Application Priority Data

Dec. 21, 2017 (KR) .......................... 1020170177493
Feb. 21, 2018 (KR) .......................... 1020180020738

(51) Int. Cl.
*G05D 1/00* (2006.01)
*G05D 1/10* (2006.01)
(Continued)

(52) U.S. Cl.
CPC ............. *G05D 1/102* (2013.01); *B64C 27/52* (2013.01); *B64C 27/82* (2013.01); *G05D 1/0858* (2013.01); *B64C 2027/8254* (2013.01)

(58) Field of Classification Search
CPC .... G05D 1/102; G05D 1/0858; G05D 1/0808; B64C 27/52; B64C 27/82;
(Continued)

(56) References Cited

U.S. PATENT DOCUMENTS 9,610,817 B1 4/2017 Piasecki et al.
2009/0014580 A1 1/2009 Piasecki et al.
(Continued)

FOREIGN PATENT DOCUMENTS

| KR | 1020030049796 | 6/2003 |
|----|---------------|--------|
| KR | 1020150058197 | 5/2015 |
| KR | 1020170135577 | 12/2017 |

OTHER PUBLICATIONS

International Search Report for International Application PCT/KR2018/011531, dated Jan. 4, 2019.

*Primary Examiner* — Ian Jen
(74) *Attorney, Agent, or Firm* — GUNTIN & GUST PLC; Miyoung Shin

(57) ABSTRACT

Provided is a vertical take-off/landing aircraft controlling a tilt angle of a main rotor, based on a vertical posture control signal during low-speed flight, wherein, when an aircraft steering signal including a vertical posture control signal for changing the pitch posture angle of the vertical take-off/landing aircraft by a first pitch posture angle is obtained, a flight controller determines a tilt angle of the main rotor with reference to the first pitch posture angle and generates a tilt angle control signal for the main rotor based on the determined tilt angle.

20 Claims, 6 Drawing Sheets

(51) Int. Cl.
*B64C 27/82* (2006.01)
*G05D 1/08* (2006.01)
*B64C 27/52* (2006.01)

(58) Field of Classification Search
CPC . B64C 2027/8254; B64C 13/16; B64C 27/08; B64C 2027/8272; B64C 27/20; B64C 27/57; B64C 39/024; B64C 29/0033; B64U 2201/00; B64U 10/10; B64U 30/20; B64D 43/00
See application file for complete search history.

(56) References Cited

U.S. PATENT DOCUMENTS

| | | | |
|---|---|---|---|
| 2016/0214710 A1 | 7/2016 | Brody et al. | |
| 2017/0349277 A1* | 12/2017 | Erhart | B64C 39/024 |
| 2018/0265191 A1* | 9/2018 | Sakuma | B64C 39/024 |
| 2020/0368629 A1* | 11/2020 | Moss | A63H 17/004 |

* cited by examiner

METHOD AND COMPUTER PROGRAM FOR CONTROLLING TILT ANGLE OF MAIN ROTOR ON BASIS OF PITCH ATTITUDE CONTROL SIGNAL LOW-SPEED FLIGHT STATE, AND VERTICAL TAKE-OFF AND LANDING AIRCRAFT

CROSS-REFERENCE TO RELATED APPLICATIONS

This application is a continuation of PCT Application No. PCT/KR2018/011531, filed Sep. 28, 2018, which claims priority to Korean Patent Application No. 10-2017-0177493, filed Dec. 21, 2017 and Korean Patent Application No. 10-2018-0020738, filed Feb. 21, 2018, the disclosures of which are hereby incorporated by reference in their entireties.

TECHNICAL FIELD

The present disclosure relates to a method of controlling a tilt angle of a main rotor based on a vertical posture control signal during low-speed flight, a computer program therefor, and a vertical take-off/landing aircraft.

BACKGROUND

Commonly used speedometers for aircrafts are capable of accurately measuring speed only at high speeds above a certain critical speed (e.g., 60 km/h). To measure speeds therebelow, helicopters generally use GPS-based inertial speedometers, and a fixed-wing aircraft often does not have a separate inertial speedometer.

An inertial speedometer may measure speed at a high speed as well as a low speed such as hovering. However, because the inertial speedometer measures speed based on positions, when there is wind, an actual air speed cannot be measured, and thus, the inertial speedometer may not be used for determining flight characteristics. On the other hand, as mentioned above, although the minimum speed that may be measured by an air speed speedometer is limited as described above, it may be used to grasp flight characteristics, because it may directly measure the dynamic pressure that affects flight characteristics, such as stall speed.

A tilt-rotor or tilt-duct vertical take-off/landing unmanned aircraft that may change the direction of a main rotor that generates thrust according to the speed is designed to change the direction of the thrust by controlling the direction of the main rotor according to the air speed.

However, in a low-speed section near the stop speed, where it is difficult to measure the air speed, it is inevitable to use a GPS-based inertial speed for the above-mentioned reason, and a very large difference occurs between the actual air speed and an inertial speed depending on the wind strength.

Therefore, when the wind blows, the air speed changes, and thus, the main rotor of an aircraft needs to be properly tilted. However, since an inertial speed does not reflect the speed of the wind, the main rotor may not be tilted according to the inertial speed. Therefore, in an inertial speed-based system operating in a windy environment, a method of automatically controlling the tilt angle of a main rotor is needed.

SUMMARY

Provided is a vertical take-off/landing aircraft that may stably fly at a low speed by controlling tilting of a main rotor in conjunction with a vertical posture control signal, and more specifically, an instruction for changing a pitch posture angle in a direction of lowering the nose of the vertical take-off/landing aircraft.

More specifically, provided is a vertical take-off/landing aircraft that may stably hover in an environment in which strong wind blows or the strength of the wind changes over time.

Provided is to change the tilt angle of the main rotor actively compensated for according to changes of the air speed due to wind by automatically generating instructions for tilting a main rotor, based on a vertical posture control signal under a low-speed flight condition where it is difficult to directly measure a wind speed.

According to an aspect of the present disclosure, a vertical take-off/landing aircraft controlling a tilt angle of a main rotor based on a vertical posture control signal during low-speed flight includes at least one main rotor configured to change its tilt angle based on a tilt angle control signal generated by a flight controller and generate thrust of the vertical take-off/landing aircraft; an auxiliary rotor configured to change a pitch posture angle of the vertical take-off/landing aircraft based on a pitch posture angle control signal; and the flight controller configured to generate the tilt angle control signal and the pitch posture angle control signal based on an aircraft steering signal of the vertical take-off/landing aircraft.

When an aircraft steering signal including a vertical posture control signal for changing the pitch posture angle of the vertical take-off/landing aircraft by a first pitch posture angle is obtained, the flight controller may determine a tilt angle of the main rotor with reference to the first pitch posture angle and generates a tilt angle control signal for the main rotor based on the determined tilt angle.

The flight controller may generate the tilt angle control signal for the main rotor in correspondence to the vertical posture control signal for changing the pitch posture angle by the first pitch posture angle only when the speed of the vertical take-off/landing aircraft is less than or equal to a predetermined critical speed.

A heading direction of the vertical take-off/landing aircraft and a traveling direction of head wind against the vertical take-off/landing aircraft may be opposite to each other. The greater the strength of the head wind is, the larger the pitch posture angle, which changes in the direction in which the nose of the vertical take-off/landing aircraft descends, may become.

The flight controller may generate a control signal for tilting the main rotor, such that a rotation axis of the main rotor becomes more parallel to the ground as the pitch posture angle changing in the direction in which the nose of the vertical take-off/landing aircraft descends increases.

The pitch posture angle changing in the direction in which the nose of the vertical take-off/landing aircraft descends and the tilt angle of the main rotor may be in a linear relationship or a non-linear relationship.

The flight controller may generate a correcting signal comprising a tilt angle correcting angle for the main rotor based on pre-set aircraft speed-main rotor tilt angle mapping data.

When an aircraft steering signal for changing the pitch posture angle of the vertical take-off/landing aircraft in a direction of lowering the nose of the vertical take-off/landing aircraft by a first pitch posture angle is obtained, the flight controller may update the aircraft speed-main rotor tilt angle mapping data, such that the tilt angle correcting angle, which is corrected according to a tilt angle correcting signal, decreases based on a current speed of the vertical take-off/landing aircraft and a current tilt angle of the main rotor.

The flight controller may control the tilt angle of the main rotor based on the tilt angle of the main rotor, which is determined with reference to the first pitch posture angle, and the correcting angle.

The pitch posture angle control signal may include at least one of a signal for controlling the number of rotations of the auxiliary rotor and a signal for controlling the collective pitch angle of the auxiliary rotor.

The pitch posture angle control signal may include a signal for controlling the cyclic pitch angle of the main rotor.

The pitch posture angle control signal may include a signal for controlling an angle of a vane control plane of the main rotor.

According to another aspect of the present disclosure, a method of controlling a vertical take-off/landing aircraft controlling a tilt angle of a main rotor, based on a vertical posture control signal during low-speed flight, includes obtaining an aircraft steering signal including a vertical posture control signal for changing the pitch posture angle of the vertical take-off/landing aircraft by a first pitch posture angle; generating a pitch posture angle control signal for changing a pitch posture angle of the vertical take-off/landing aircraft based on the vertical posture control signal; and determining a tilt angle of the main rotor with reference to the first pitch posture angle and generating a tilt angle control signal for the main rotor based on the determined tilt angle.

The tilt angle control signal for the main rotor may be generated in correspondence to the vertical posture control signal for changing the pitch posture angle by the first pitch posture angle only when the speed of the vertical take-off/landing aircraft is less than or equal to a predetermined critical speed.

A heading direction of the vertical take-off/landing aircraft and a traveling direction of head wind against the vertical take-off/landing aircraft may be opposite to each other. The greater the strength of the head wind is, the larger the pitch posture angle, which changes in the direction in which the nose of the vertical take-off/landing aircraft descends, may become.

A control signal for tilting the main rotor may be generated, such that a rotation axis of the main rotor becomes more parallel to the ground as the pitch posture angle changing in the direction in which the nose of the vertical take-off/landing aircraft descends increases.

The pitch posture angle changing in the direction in which the nose of the vertical take-off/landing aircraft descends and the tilt angle of the main rotor may be in a linear relationship or a non-linear relationship.

The method may further include, after the generating of the tilt angle control signal of the main rotor, generating a correcting signal including a tilt angle correcting angle for the main rotor based on pre-set aircraft speed-main rotor tilt angle mapping data.

The generating of the correcting signal may include, when an aircraft steering signal for changing the pitch posture angle of the vertical take-off/landing aircraft in a direction of lowering the nose of the vertical take-off/landing aircraft by a first pitch posture angle is obtained, updating the pre-set aircraft speed-main rotor tilt angle mapping data, such that the tilt angle correcting angle, which is corrected according to a tilt angle correcting signal, decreases based on a current speed of the vertical take-off/landing aircraft and a current tilt angle of the main rotor.

In the generating of the correcting signal, the tilt angle of the main rotor may be controlled based on the tilt angle of the main rotor, which is determined with reference to the first pitch posture angle, and the correcting angle.

The pitch posture angle control signal may include at least one of a signal for controlling the number of rotations of the auxiliary rotor 300 and a signal for controlling the collective pitch angle of the auxiliary rotor.

The pitch posture angle control signal may include a signal for controlling the cyclic pitch angle of the main rotor.

The pitch posture angle control signal may include a signal for controlling an angle of a vane control plane of the main rotor.

According to embodiments of the present disclosure, a vertical take-off/landing aircraft may stably hover and fly at a low speed by controlling tilting of a main rotor in conjunction with a vertical posture control signal, and more specifically, an instruction for changing a pitch posture angle in a direction of lowering the nose of the vertical take-off/landing aircraft.

Also, the vertical take-off/landing aircraft may stably hover in an environment in which strong wind blows or the strength of the wind changes over time.

Accordingly, by automatically generating an instruction for tilting a main rotor, based on a vertical posture control signal under a low-speed flight condition where it is difficult to directly measure a wind speed, the tilt angle of the main rotor may be actively compensated for according to changes of the air speed due to wind.

DETAILED DESCRIPTION OF EMBODIMENTS

Figure 1:
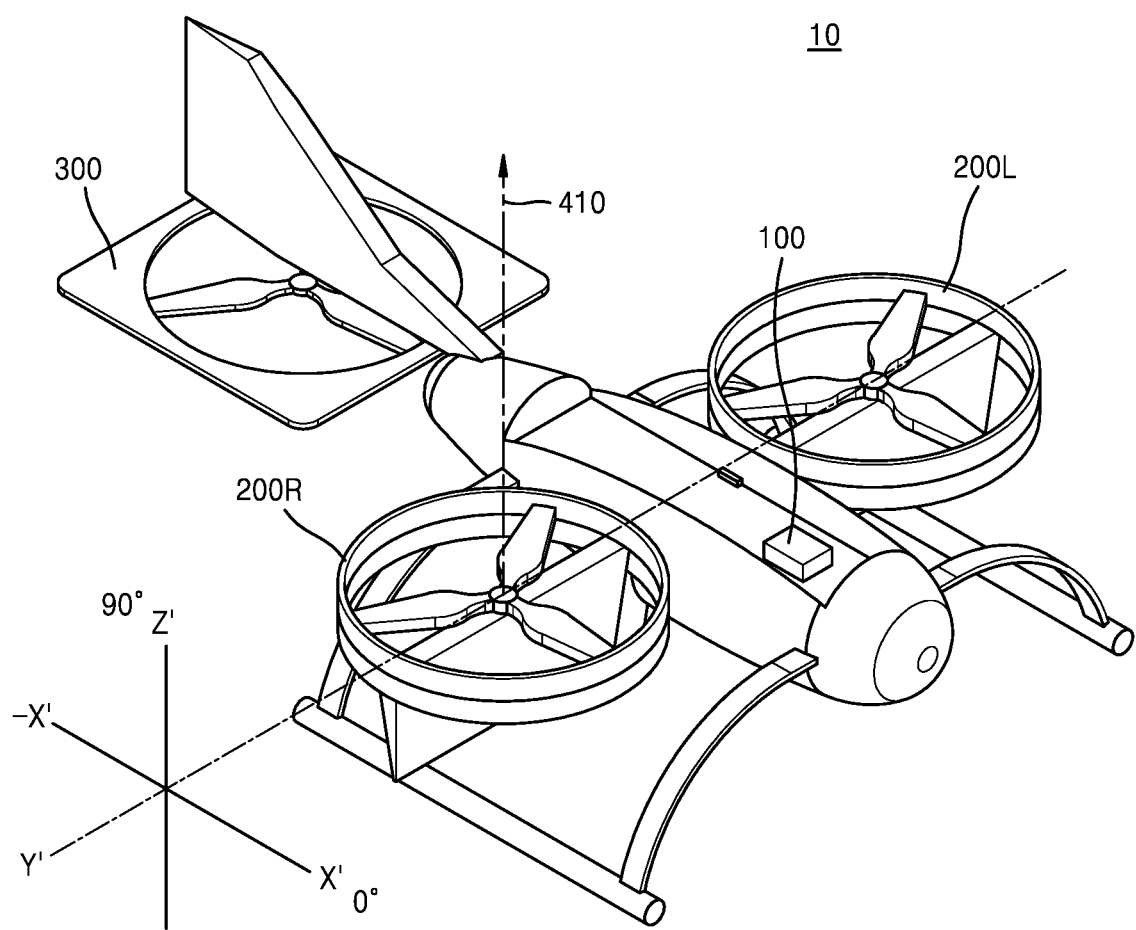
FIG. 1 is a schematic view of a vertical take-off/landing aircraft according to an embodiment of the present disclosure.

According to an aspect of the present disclosure, a vertical take-off/landing aircraft controlling a tilt angle of a main rotor, based on a vertical posture control signal during low-speed flight, includes at least one main rotor configured to change its tilt angle based on a tilt angle control signal generated by a flight controller and generate thrust of the vertical take-off/landing aircraft; an auxiliary rotor configured to change a pitch posture angle of the vertical take-off/landing aircraft based on a pitch posture angle control signal; and the flight controller configured to generate the tilt angle control signal and the pitch posture angle control signal based on an aircraft steering signal of the vertical take-off/landing aircraft, wherein, when an aircraft steering signal including a vertical posture control signal for changing the pitch posture angle of the vertical take-off/landing aircraft by a first pitch posture angle is obtained, the flight controller may determine a tilt angle of the main rotor with reference to the first pitch posture angle and generate a tilt angle control signal for the main rotor based on the determined tilt angle.

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

Reference will now be made in detail to embodiments, examples of which are illustrated in the accompanying drawings. In the drawings, the same elements are denoted by the same reference numerals, and a repeated explanation thereof will not be given.

It will be understood that although the terms "first", "second", etc. may be used herein to describe various elements, these elements should not be limited by these terms. These elements are only used to distinguish one element from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto.

FIG. 1 is a schematic view of a vertical take-off/landing aircraft 10 according to an embodiment of the present disclosure.

In the present disclosure, the 'vertical take-off/landing aircraft' 10 may refer to various types of aircrafts capable of taking off and/or landing in a direction perpendicular to the ground. For example, the vertical take-off/landing aircraft 10 may be an aircraft similar to an aircraft shown in FIG. 1, which includes two main rotors 200R and 200L, an auxiliary rotor 300, and a flight controller 100 controlling them.

A tilt angle of the main rotors 200R and 200L according to an embodiment of the present disclosure may be changed based on a tilt angle control signal generated by the flight controller 100. At this time, the tilt angle of the main rotors 200R and 200L may be defined in a direction parallel to a rotation axis vector 410 of the main rotors 200R and 200L.

For example, in FIG. 1, rotation planes of the main rotors 200R and 200L may be parallel to an X'-Y' plane. Therefore, the rotation axis vector 410 may be in a +Z' direction, and thus, the tilt angle of the main rotors 200R and 200L may correspond to 90 degrees.

Moreover, when the vertical take-off/landing aircraft 10 is flying at a high speed, the rotation planes of the main rotors 200R and 200L may be parallel to a Y'-Z 'plane. Therefore, the rotation axis vector 410 may be in a +X' direction, and thus, the tilt angle of the main rotors 200R and 200L may correspond to 0 degrees.

At this time, the X', Y', and Z' coordinate system is a relative coordinate system and may be a coordinate system based on the vertical take-off/landing aircraft 10. Defining the tilt angle of the main rotors 200R and 200L based on the rotation axis vector 410 as described above is merely an example, and the technical spirit of the present disclosure is not limited thereto.

The main rotors 200R and 200L according to an embodiment of the present disclosure may generate thrust of the vertical take-off/landing aircraft 10 in directions of the tilt angle according to a tilt angle control signal generated by the flight controller 100. At this time, the 'thrust' refers to a force that pushes the vertical take-off/landing aircraft 10 in a direction in which the vertical take-off/landing aircraft 10 moves and may refer to a propulsion force generated by rotation of the main rotors 200R and 200L.

The main rotors 200R and 200L according to an embodiment of the present disclosure may include at least one of a cyclic pitch angle adjuster (not shown) and a vane control plane angle adjuster (not shown) instead of or together with the auxiliary rotor 300 described below. The cyclic pitch angle adjuster (not shown) and the vane control plane angle adjuster (not shown) may operate based on a pitch posture angle control signal described below. Detailed descriptions thereof will be given below.

The number of main rotors 200R and 200L may be one or more depending on the type of the vertical take-off/landing aircraft 10. However, for convenience of explanation, descriptions will be given below under an assumption that there are two main rotors 200R and 200L as shown in FIG. 1.

The auxiliary rotor 300 according to an embodiment of the present disclosure may change a pitch posture angle of the vertical take-off/landing aircraft 10 based on a vertical posture control signal.

In the present disclosure, the 'pitch posture angle of the vertical take-off/landing aircraft 10' may refer to a degree to which the vertical take-off/landing aircraft 10 is inclined with respect to the ground. For example, when the pitch posture angle is 0 degrees, it may indicate a state in which the vertical take-off/landing aircraft 10 is parallel to the ground. Also, when the pitch posture angle is 10 degrees in a direction in which the nose of the vertical take-off/landing aircraft 10 descends, it may indicate that a front portion of the vertical take-off/landing aircraft 10 is lower than a rear portion. In the present disclosure, the 'nose' may refer to the front portion of an aircraft.

Moreover, when the auxiliary rotor 300 rotates rapidly, thrust generated by the auxiliary rotor 300 increases, and thus, the pitch posture angle in the direction in which the nose of the vertical take-off/landing aircraft 10 descends may increase.

Also, when the auxiliary rotor 300 rotates relatively slow, thrust generated by the auxiliary rotor 300 decreases, and thus, the pitch posture angle in the direction in which the nose of the vertical take-off/landing aircraft 10 descends may decrease.

Moreover, the auxiliary rotor 300 according to an embodiment of the present disclosure may further include a collective pitch angle adjuster (not shown) for adjusting a collective pitch angle of the auxiliary rotor 300. The collective pitch angle adjuster (not shown) may adjust the collective pitch angle of the auxiliary rotor 300 according to the pitch posture angle control signal. When the collective pitch angle of the auxiliary rotor 300 increases, thrust generated by the auxiliary rotor 300 increases, and thus, the pitch posture angle in the direction in which the nose of the vertical take-off/landing aircraft 10 descends may increase.

Also, when the collective pitch angle of the auxiliary rotor 300 relatively decreases, thrust generated by the auxiliary rotor 300 decreases, and thus, the pitch posture angle in the direction in which the nose of the vertical take-off/landing aircraft 10 descends may decrease.

Moreover, the vertical take-off/landing aircraft 10 according to another embodiment of the present disclosure may include at least one of the cyclic pitch angle adjuster (not shown) of the main rotors 200R and 200L and the vane control plane angle adjuster (not shown) of the main rotors 200R and 200L instead of or together with the auxiliary rotor 300.

The cyclic pitch angle adjuster (not shown) and the vane control plane angle adjuster (not shown) may adjust the pitch posture angle of the vertical take-off/landing aircraft 10 based on the pitch posture angle control signal instead of or together with the auxiliary rotor 300.

However, for convenience of explanation, descriptions are given below under an assumption that the pitch posture angle of the vertical take-off/landing aircraft 10 is adjusted by the auxiliary rotor 300.

The flight controller 100 according to an embodiment of the present disclosure may perform various operations for the flight of the vertical take-off/landing aircraft 10. For example, the flight controller 100 may control the vertical take-off/landing aircraft 10 to fly according to a flight schedule by comparing a current position of the vertical take-off/landing aircraft 10 with a pre-set flight schedule. Also, the flight controller 100 may receive a steering signal of the vertical take-off/landing aircraft 10 from a user and control the vertical take-off/landing aircraft 10 based on the steering signal. Also, the flight controller 100 may control the main rotors 200R and 200L and the auxiliary rotor 300 described above in various situations.

Also, the flight controller 100 according to an embodiment of the present disclosure may control the vertical take-off/landing aircraft 10, such that a heading direction of the vertical take-off/landing aircraft 10 is opposite to a traveling direction of head wind 500 against the vertical take-off/landing aircraft 10.

However, for convenience of explanation, descriptions given below will focus on the technical configuration that the vertical take-off/landing aircraft 10 controls the main rotors 200R and 200L and/or the auxiliary rotor 300 during a low-speed flight.

Moreover, in the present disclosure, the 'low speed flight' may include both a case of hovering for take-off and/or landing and a case of being suspended in the air or moving at a low speed for a predetermined purpose.

Figure 2:
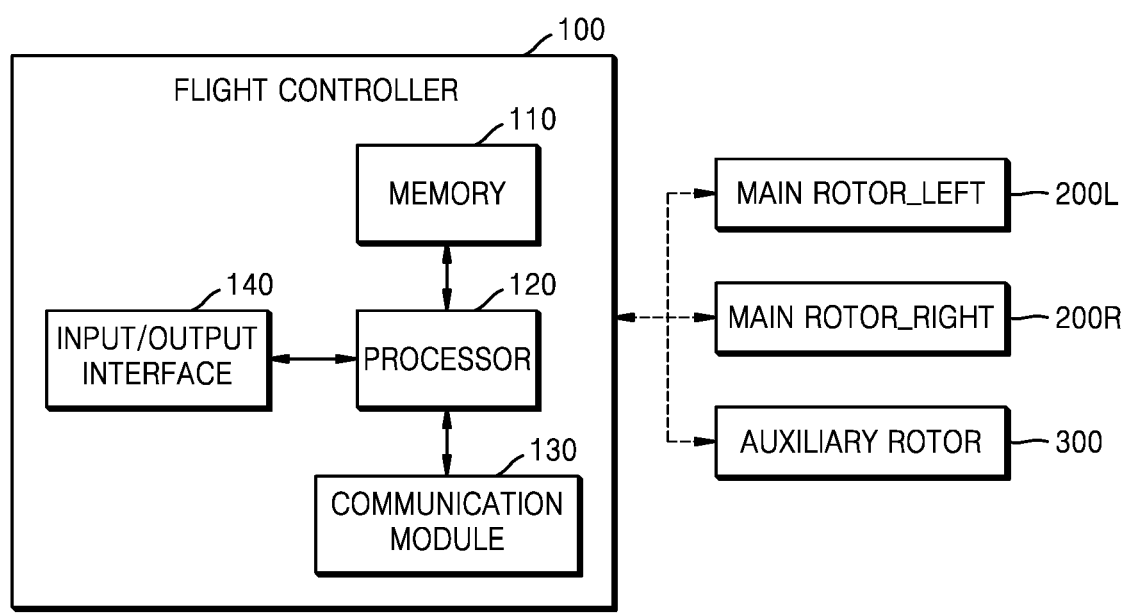
FIG. 2 is a schematic diagram showing a configuration of a flight controller according to an embodiment of the present disclosure.

FIG. 2 is a schematic diagram showing a configuration of a flight controller 100 according to an embodiment of the present disclosure.

The flight controller 100 according to an embodiment of the present disclosure may include a memory 110, a processor 120, a communication module 130, and an input/output interface 140, as shown in FIG. 2.

The memory 110 is a computer-readable recording medium and may include random access memory (RAM), read only memory (ROM), and a permanent mass storage device like a disk drive. Also, an operating system and at least one program code may be stored in the memory 110.

The processor 120 may be configured to process instructions of a computer program by performing basic arithmetic, logic, and input/output operations. Instructions may be provided to the processor 120 by the memory 110 or the communication module 130. For example, the processor 120 may be configured to execute a received instruction according to program code stored in a recording device like the memory 110.

The communication module 130 may provide a function for communicating with an external device, such as a user terminal (not shown). For example, the communication module 130 may receive a signal for controlling the vertical take-off/landing aircraft 10 from a user terminal (not shown) and transmit the signal to the processor 120.

The input/output interface 140 may be a unit for interfacing with an input/output device. At this time, an input device may include various sensors for determining the flight status of the vertical take-off/landing aircraft 10, for example. For example, the input device may include a GPS sensor, an altimeter, and a geomagnetic sensor to determine a flight position of the vertical take-off/landing aircraft 10.

Moreover, the flight controller 100 according to an embodiment of the present disclosure may be connected to the main rotors 200L and 200R and the auxiliary rotor 300 to control the tilt angle of the main rotors 200L and 200R based on a vertical posture control signal. The flight controller 100 may generate control signals for respectively controlling the main rotors 200L and 200R and the auxiliary rotor 300 and transmit the signals to them.

Descriptions given below with reference to FIGS. 3 to 6 will focus on a method of generating control signals for respectively controlling the main rotors 200L and 200R and the auxiliary rotor 300 based on a vertical posture control signal during a hovering state.

Figure 3:
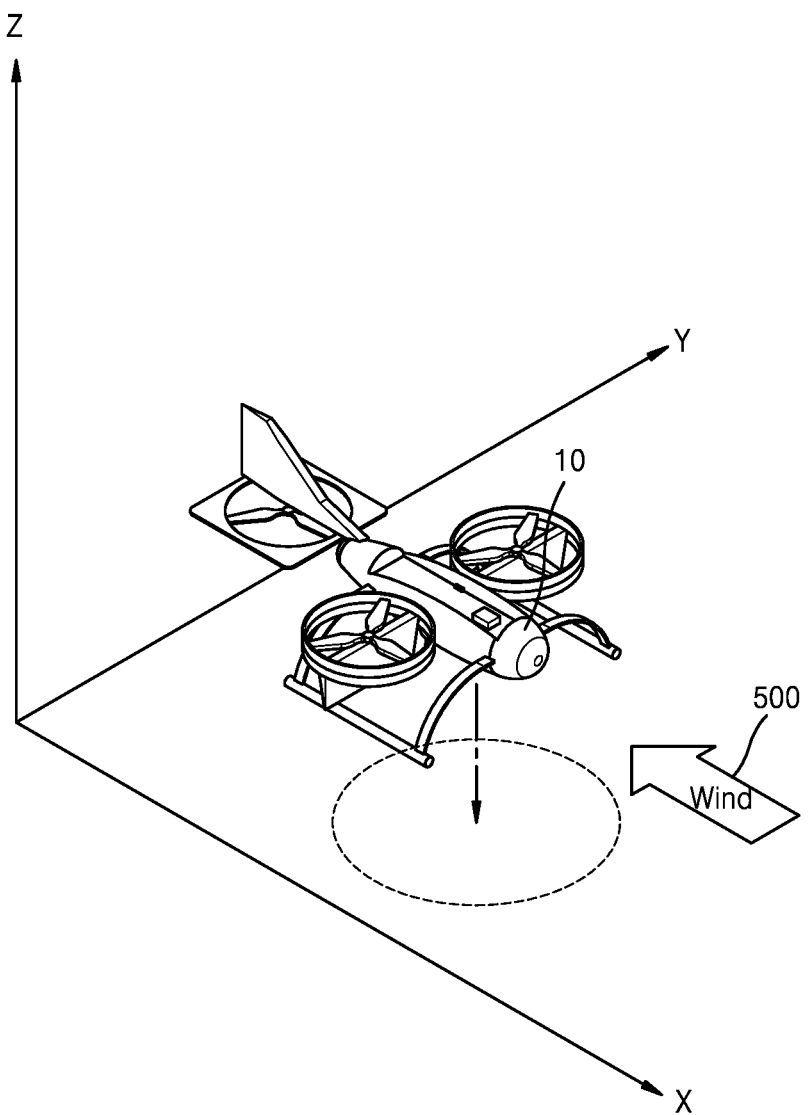
FIG. 3 is a diagram showing an example of an environment in which a vertical take-off/landing aircraft hovers according to an embodiment of the present disclosure.

FIG. 3 is a diagram showing an example of an environment in which the vertical take-off/landing aircraft 10 hovers according to an embodiment of the present disclosure.

Descriptions will be given below with reference to FIGS. 4A to 6 under an assumption that the vertical take-off/landing aircraft 10 is hovering for landing as shown in FIG. 3 and the heading direction (+X direction) of the vertical take-off/landing aircraft 10 is opposite to the traveling direction (−X direction) of the head wind 500 against the vertical take-off/landing aircraft 10. In other words, descriptions will be given below under an assumption that, on an X-Y plane, there is a 180 degrees difference between the heading direction (+X direction) of the vertical take-off/landing aircraft 10 and the traveling direction (−X direction) of the head wind 500.

Figure 4A:
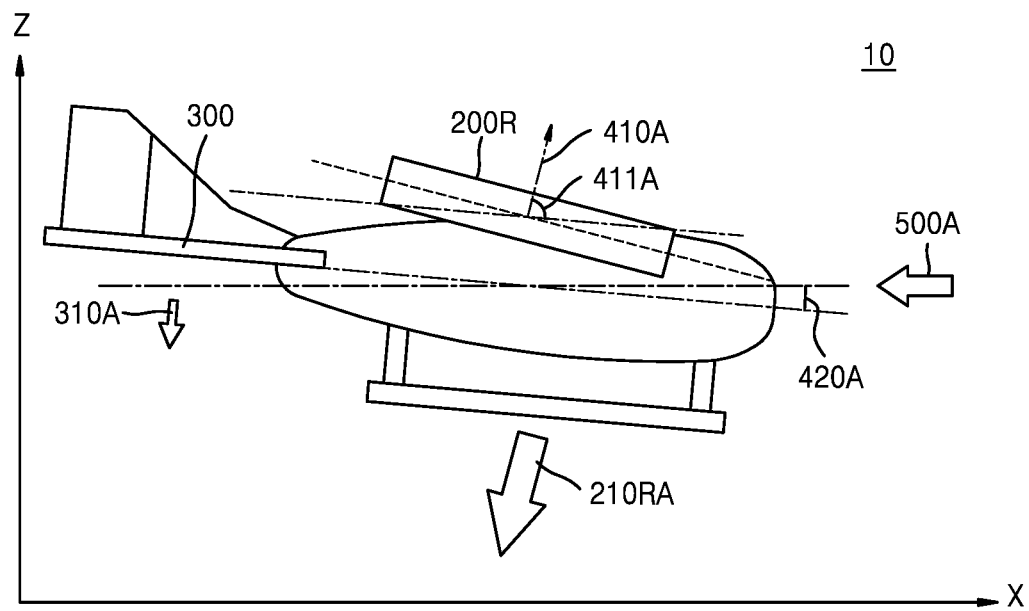
FIGS. 4A and 4B are diagrams for describing a method, performed by a flight controller, of tilting a main rotor in various environments, according to an embodiment of the present disclosure.
Figure 4B:
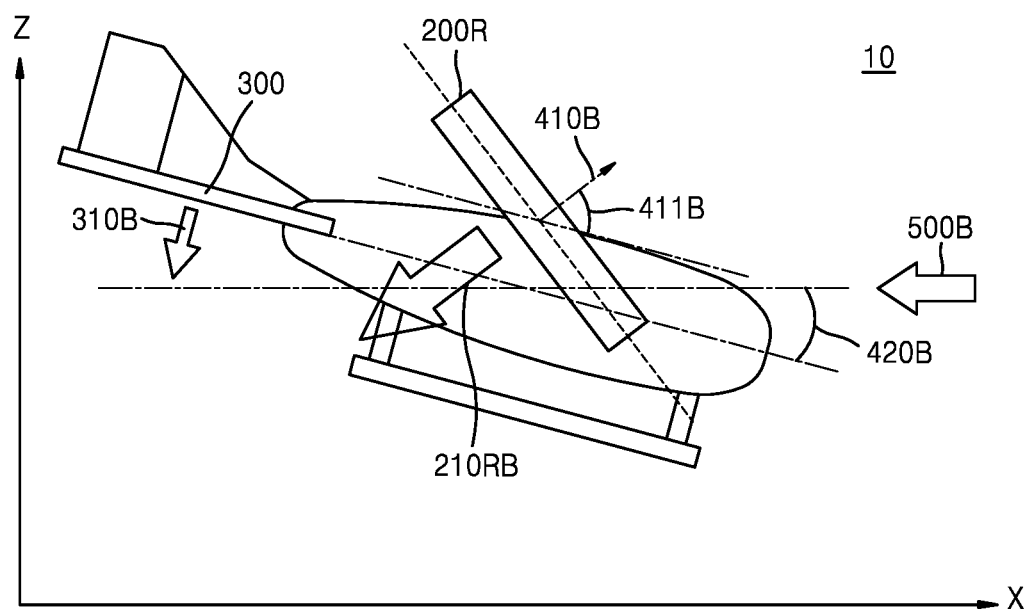

Moreover, the X, Y, and Z coordinate system shown in FIGS. 3 to 4B is an absolute coordinate system based on the ground and may be different from the X', Y', and Z' coordinate system based on the vertical take-off/landing aircraft 10 (described above with reference to FIG. 1).

Under the above-stated assumptions, when an aircraft steering signal including a vertical posture control signal for changing the pitch posture angle of the vertical take-off/landing aircraft 10 by a first pitch posture angle is received, the flight controller 100 according to an embodiment of the present disclosure may determine the tilt angle of the main rotors 200R and 200L with reference to the first pitch posture angle and generate tilt angle control signals for the main rotors 200R and 200L based on the determined tilt angle.

In the present disclosure, the 'aircraft steering signal' refers to a signal for steering the vertical take-off/landing aircraft 10. The aircraft steering signal may be received from a user terminal (not shown) or may be generated by the flight controller 100 according to a pre-set flight schedule.

Such an aircraft steering signal may include a signal for controlling the posture of an aircraft in horizontal directions and a signal for controlling the posture of the aircraft in vertical directions.

For example, a signal for controlling the posture in the horizontal directions may include a signal for controlling speed in the horizontal directions, a signal for controlling a horizontal rotation direction, etc. Moreover, a signal for controlling the posture in the vertical directions may include a signal for controlling speed in the vertical directions, a signal for changing the pitch posture angle of the vertical take-off/landing aircraft 10, etc. However, these are merely examples, and an aircraft steering signal may further include various signals in addition to the above-described signals or may not include at least some of the above-described signals.

Moreover, an aircraft steering signal may include a vertical posture control signal for increasing the pitch posture angle in the direction in which the nose of the vertical take-off/landing aircraft 10 descends as the head wind 500 becomes stronger.

In other words, to maintain a hovering state, a user or the flight controller 100 may control the nose of the vertical take-off/landing aircraft 10 to be lowered, that is, control the front portion of the vertical take-off/landing aircraft 10 to be lower than the rear portion of the vertical take-off/landing aircraft 10, as the head wind 500 becomes stronger.

The flight controller 100 according to an embodiment of the present disclosure may generate control signals for the main rotors 200R and 200L to tilt the main rotors 200R and 200L, such that the rotation axes of the main rotors 200R and 200L become more parallel to the ground as the pitch posture angle changing in the direction in which the nose of the vertical take-off/landing aircraft 10 descends increases. At this time, the controller 100 may generate a control signal for tilting the main rotor 200, such that the pitch posture angle changing in the direction in which the nose of the vertical take-off/landing aircraft 10 descends and the tilt angle of the main rotors 200R and 200L satisfy a linear relationship or a nonlinear relationship.

FIGS. 4A and 4B are diagrams for describing a method, performed by which the flight controller 100, of tilting a main rotor 200R in various environments, according to an embodiment of the present disclosure.

For convenience of explanation, descriptions will be given below under an assumption that the vertical take-off/landing aircraft 10 is hovering for landing as shown in FIG. 3 and the heading direction of the vertical take-off/landing aircraft 10 is opposite to traveling directions of head winds 500A and 500B against the vertical take-off/landing aircraft 10. Also, it is assumed that head wind 500B of FIG. 4B is stronger than head wind 500A of FIG. 4A.

Referring to FIG. 4A under the above-described assumption, the flight controller 100 according to an embodiment of the present disclosure may control the auxiliary rotor 300, such that the nose of the vertical take-off/landing aircraft 10 descends to maintain a hovering state against the head wind 500A.

At this time, the flight controller 100 may increase the number of rotations of the auxiliary rotor 300 or the collective pitch angle to increase thrust 310A generated by the auxiliary rotor 300, and thus, the vertical take-off/landing aircraft 10 may have a pitch posture angle 420A.

Moreover, as described above, the flight controller 100 according to an embodiment of the present disclosure may tilt the main rotor 200R, such that the rotation axis of the main rotor 200R becomes more parallel to the ground as the pitch posture angle 420A changing in the direction in which the nose of the vertical take-off/landing aircraft 10 descends increases.

In other words, the flight controller 100 according to an embodiment of the present disclosure may control a tilt angle 411A of the main rotor 200R, such that a tilt angle 411A decreases as the pitch posture angle 420A increases. At this time, the tilt angle 411A may refer to an angle defined in the direction of the rotation axis vector 410A of the main rotor 200R in the X', Y', and Z' coordinate system as described above with reference to FIG. 1.

The main rotor 200R may generate thrust 210RA according to the changed tilt angle 411A, such that the vertical take-off/landing aircraft 10 may stably hover.

On the other hand, referring to FIG. 4B in contrast to FIG. 4A, the flight controller 100 according to an embodiment of the present disclosure may control the auxiliary rotor 300, such that the nose of the vertical take-off/landing aircraft 10 is further lowered to maintain a hovering state against stronger head wind 500B.

At this time, the flight controller 100 may increase the number of rotations of the auxiliary rotor 300 or the collective pitch angle to increase thrust 310B generated by the auxiliary rotor 300 more than the thrust 310A of FIG. 4A, and thus, the vertical take-off/landing aircraft 10 may have a greater pitch posture angle 420B.

Moreover, as described above, the flight controller 100 according to an embodiment of the present disclosure may tilt the main rotor 200R, such that the rotation axis of the main rotor 200R becomes more parallel to the ground as the pitch posture angle 420B changing in the direction in which the nose of the vertical take-off/landing aircraft 10 descends increases.

In other words, the flight controller 100 according to an embodiment of the present disclosure may control a tilt angle 411B of the main rotor 200R, such that a tilt angle 411B decreases as the pitch posture angle 420B increases. At this time, the tilt angle 411B may refer to an angle defined in the direction of the rotation axis vector 410B of the main rotor 200R in the X', Y', and Z' coordinate system as described above with reference to FIG. 1.

The main rotor 200R may generate thrust 210RB according to the smaller tilt angle 411B, such that the vertical take-off/landing aircraft 10 may stably hover against the strong head wind 500B.

The flight controller 100 according to an embodiment of the present disclosure may perform the operations described with respect to FIGS. 4A and 4B only when the speed of the vertical take-off/landing aircraft 10 is less than or equal to a predetermined critical speed. In other words, when it is necessary for the vertical take-off/landing aircraft 10 to maintain a constant flight position for take-off or landing or to fly at a desired speed, the flight controller 100 according to an embodiment of the present disclosure may generate tilt angle control signals for main rotors in correspondence to a vertical posture control signal.

Also, the flight controller 100 according to an embodiment of the present disclosure may also perform the controls according to the descriptions given above with reference to FIGS. 4A and 4B with respect to a left main rotor 200L.

The flight controller 100 according to an embodiment of the present disclosure may generate a correcting signal including a tilt angle correcting angle of the main rotor 200 based on pre-set aircraft speed-main rotor tilt angle mapping data. In the present disclosure, the 'tilt angle correcting angle' may refer to an angle for correcting a tilt angle calculated by the flight controller 100 through the above-described process. Also, the 'aircraft speed-main rotor tilt angle mapping data' may refer to data including a tilt angle of the main rotor 200 at each speed of an aircraft.

Figure 5A:
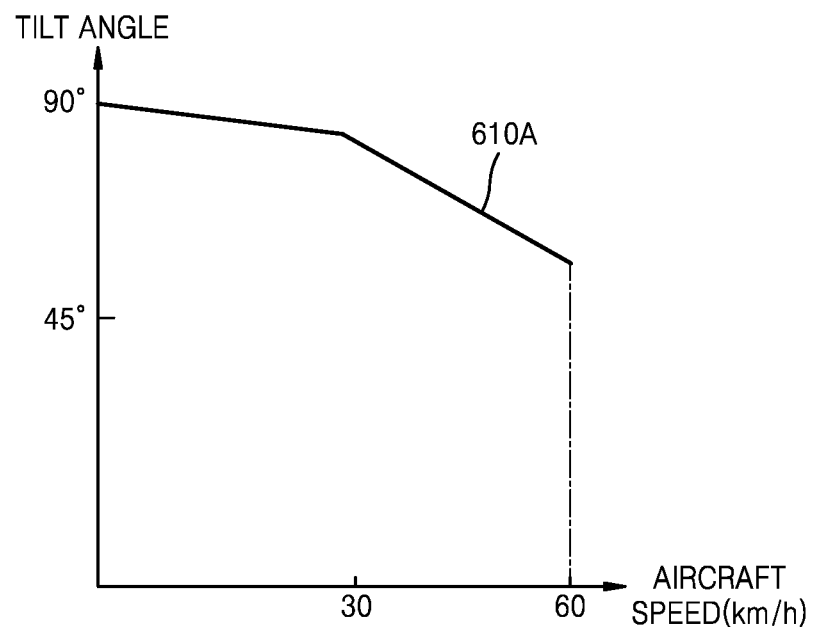
FIG. 5A is a diagram showing an example of aircraft speed-main rotor tilt angle mapping data according to an embodiment of the present disclosure.

FIG. 5A is a diagram showing an example of aircraft speed-main rotor tilt angle mapping data 610A according to an embodiment of the present disclosure.

The flight controller 100 according to an embodiment of the present disclosure may check the speed of the vertical take-off/landing aircraft 10 and determine an appropriate tilt angle of the main rotors 200R and 200L at the corresponding speed with reference to the aircraft speed-main rotor tilt angle mapping data 610A. For example, when the speed of the vertical take-off/landing aircraft 10 is 0 km/h, the flight controller 100 may determine 90 degrees as the appropriate tilt angle of the main rotors 200R and 200L.

Subsequently, the flight controller 100 according to an embodiment of the present disclosure may compare the tilt angle of the main rotors 200R and 200L according to the aircraft speed-main rotor tilt angle mapping data 610A with a current tilt angle of the main rotors 200R and 200L and calculate a difference angle therebetween. Also, the flight controller 100 may generate a correcting signal including a tilt angle correcting angle for the main rotors 200R and 200L based on the difference angle.

For example, as in the above-stated example, when the speed of the vertical take-off/landing aircraft 10 is 0 km/h, the flight controller 100 may determine 90 degrees as the appropriate tilt angle of the main rotors 200R and 200L. However, when the actual (current) tilt angle of the main rotors 200R and 200L is 80 degrees, the flight controller 100 may generate a correcting signal that utilizes 10 degrees, which is the difference between the both angles (the tilt angle according to the aircraft speed-main rotor tilt angle mapping data 610A and the actual tilt angle, as a correcting angle. However, since tilt angles of the main rotors 200R and 200L according to the above-stated aircraft speed-main rotor tilt angle mapping data 610A are mapping data corresponding to inertial speeds when there is no wind, the tilt angles of the main rotors 200R and 200L according to the aircraft speed-main rotor tilt angle mapping data 610A may not be appropriate when there is wind.

Therefore, when an aircraft steering signal for changing the pitch posture angle of the vertical take-off/landing aircraft 10 by a second pitch posture angle in the direction in which the nose of the vertical take-off/landing aircraft 10 is lowered is obtained, the flight controller 100 according to an embodiment of the present disclosure may update aircraft speed-main rotor tilt angle mapping data, such that a tilt angle correcting angle for the main rotors 200R and 200L, which is compensated for according to a correcting signal for the tilt angle, decreases based on a current speed of the vertical take-off/landing aircraft 10 and a current tilt angle of the main rotors 200R and 200L.

Figure 5B:
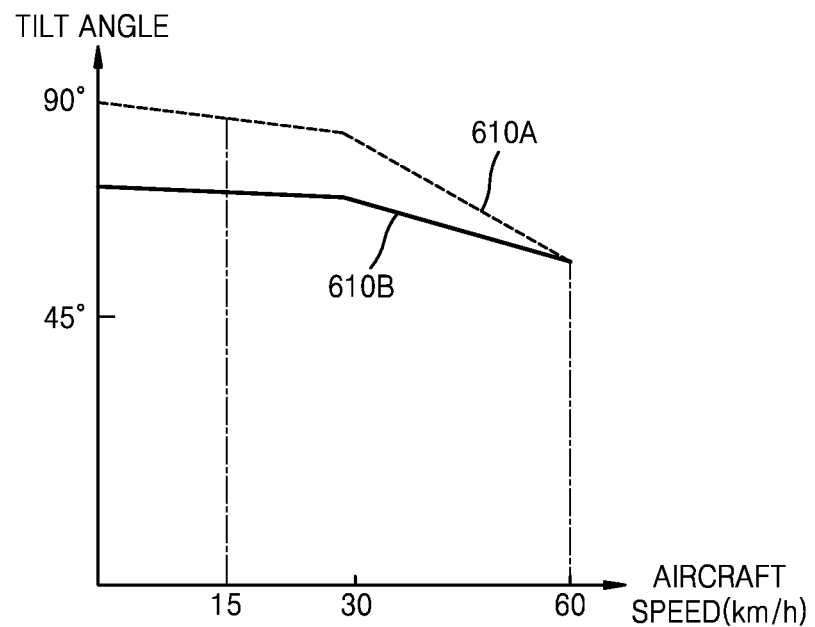
FIG. 5B is a diagram showing an example of aircraft speed-main rotor tilt angle mapping data updated by a flight controller according to an embodiment of the present disclosure.

FIG. 5B is a diagram showing an example of aircraft speed-main rotor tilt angle mapping data 610B updated by the flight controller 100 according to an embodiment of the present disclosure.

As described above, the tilt angle of the main rotors 200R and 200L of the vertical take-off/landing aircraft 10 according to the aircraft speed-main rotor tilt angle mapping data 610A corresponding to cases where there is no wind may, when there is wind, cause the vertical take-off/landing aircraft 10 to move in the traveling direction of the wind.

Therefore, when an aircraft steering signal for changing the pitch posture angle of the vertical take-off/landing aircraft 10 by a second pitch posture angle in the direction in which the nose of the vertical take-off/landing aircraft 10 is lowered is obtained, the flight controller 100 according to an embodiment of the present disclosure may update aircraft speed-main rotor tilt angle mapping data, such that a tilt angle correcting angle for the main rotors 200R and 200L, which is compensated for according to a correcting signal for the tilt angle, decreases based on a current speed of the vertical take-off/landing aircraft 10 and a current tilt angle of the main rotors 200R and 200L, like the aircraft speed-main rotor tilt angle mapping data 610B shown in FIG. 5B.

For example, when the vertical take-off/landing aircraft 10 maintains its speed at 0 km/h in a windy environment, the flight controller 100 may determine 90 degrees as the appropriate tilt angle of the main rotors 200R and 200L with reference to the aircraft speed-main rotor tilt angle mapping data 610A.

However, to maintain a hovering position against the wind, when an actual (current) tilt angle of the main rotors 200R and 200L is 80 degrees, the flight controller 100 may generate a correcting signal that utilizes 10 degrees, which is a difference angle between the tilt angle according to the aircraft speed-main rotor tilt angle mapping data 610A and the actual tilt angle, as a correcting angle. Furthermore, the flight controller 100 may control the tilt angle of the main rotors 200R and 200L to be 80 degrees according to the correcting signal, and thus, the vertical take-off/landing aircraft 10 may hover against the wind. When no correcting signal is generated, because the ground speed is 0 km/h, the tilt angle is restored to 90 degrees by the aircraft speed-main rotor tilt angle mapping data 610A and pushed by the wind.

In other words, tilt angles of the main rotors 200R and 200L according to the aircraft speed-main rotor tilt angle mapping data 610A are defined based on inertial speeds without taking air speeds due to wind into account. Therefore, when wind blows around the vertical take-off/landing aircraft 10, the tilt angles of the main rotors 200R and 200L according to the aircraft speed-main rotor tilt angle mapping data need to be suitably adjusted according to wind strength.

Therefore, when an aircraft steering signal for changing the pitch posture angle of the vertical take-off/landing aircraft 10 by a second pitch posture angle in the direction in which the nose of the vertical take-off/landing aircraft 10 is lowered is obtained, the flight controller 100 according to an embodiment of the present disclosure may update aircraft speed-main rotor tilt angle mapping data, such that a tilt angle correcting angle for the main rotors 200R and 200L, which is compensated for according to a correcting signal for the tilt angle, decreases (e.g., the tilt angle correcting angle becomes 0 degrees) based on a current speed of the vertical take-off/landing aircraft 10 and a current tilt angle of the main rotors 200R and 200L, like the aircraft speed-main rotor tilt angle mapping data 610B.

For example, it may be seen that, when the speed of the vertical take-off/landing aircraft 10 is 15 km/h, a tilt angle according to first mapping data 610A is approximately 90 degrees, whereas a tilt angle according to second mapping data 610B is approximately 70 degrees. In other words, when wind is blowing around the vertical take-off/landing aircraft 10, the tilt angle of the main rotors 200R and 200L may be less than the tilt angle of the main rotors 200R and 200L in a case where there is no wind.

Accordingly, according to the present disclosure, the vertical take-off/landing aircraft 10 may hover and fly at a low speed more stably by actively adopting to changes of the surrounding wind environment.

Figure 6:
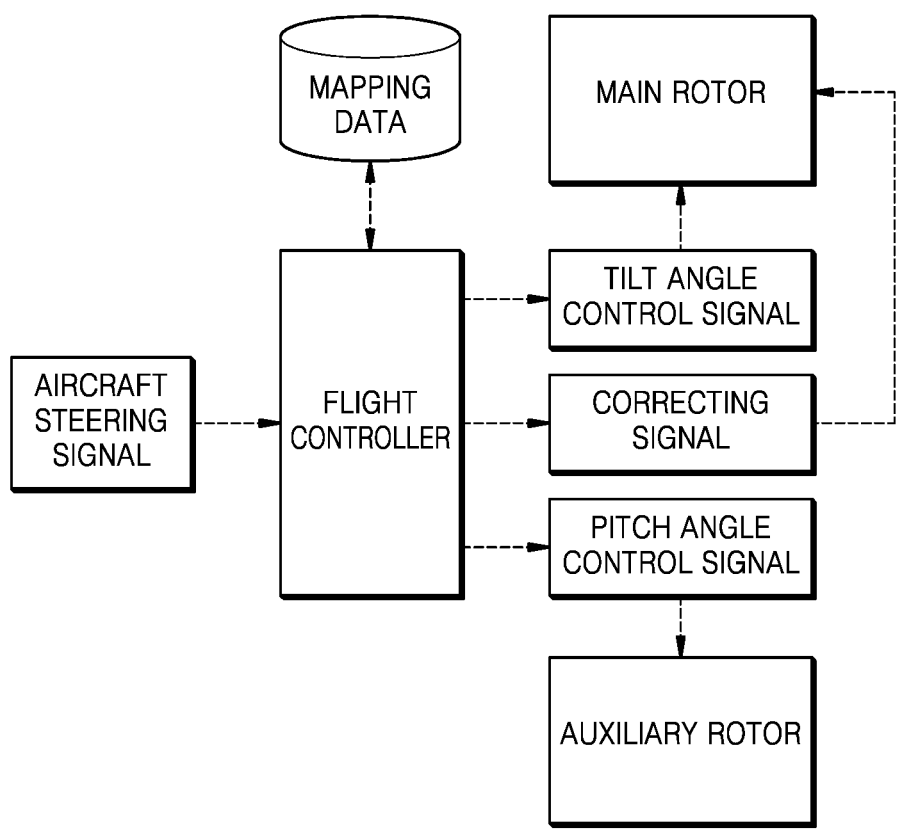
FIG. 6 is a diagram for describing a method of controlling a vertical take-off/landing aircraft, wherein the method is performed by a flight controller, according to an embodiment of the present disclosure.

FIG. 6 is a diagram for describing a method of controlling the vertical take-off/landing aircraft 10, wherein the method is performed by the flight controller 100, according to an embodiment of the present disclosure. Hereinafter, descriptions identical to those already given above with reference to FIGS. 1 to 5B will be omitted, but descriptions will be given below with reference to FIGS. 1 to 5B together.

The flight controller 100 according to an embodiment of the present disclosure may obtain an aircraft steering signal including a vertical posture control signal for changing the pitch posture angle of the vertical take-off/landing aircraft 10 by the first pitch posture angle.

In the present disclosure, the 'aircraft steering signal' refers to a signal for steering the vertical take-off/landing aircraft 10. The aircraft steering signal may be received from a user terminal (not shown) or may be generated by the flight controller 100 according to a pre-set flight schedule.

Such an aircraft steering signal may include a signal for controlling the posture of an aircraft in horizontal directions and a signal for controlling the posture of the aircraft in vertical directions.

For example, a signal for controlling the posture in the horizontal directions may include a signal for controlling speed in the horizontal directions, a signal for controlling a horizontal rolling direction, etc. Also, the signal for controlling the posture in the horizontal directions may include a signal for controlling the heading direction of the vertical take-off/landing aircraft 10 to the direction in which wind blows. Moreover, a signal for controlling the posture in the vertical directions may include a signal for controlling speed in the vertical directions, a signal for changing the pitch posture angle of the vertical take-off/landing aircraft 10, etc. However, these are merely examples, and an aircraft steering signal may further include various signals in addition to the above-described signals or may not include at least some of the above-described signals.

Moreover, an aircraft steering signal may include a vertical posture control signal for increasing the pitch posture angle in the direction in which the nose of the vertical take-off/landing aircraft 10 descends as the head wind 500 becomes stronger.

Therefore, the flight controller 100 according to an embodiment of the present disclosure may generate a pitch posture angle control signal for lowering the nose of the vertical take-off/landing aircraft 10 to maintain the hovering state as the wind becomes stronger.

In other words, the flight controller 100 according to an embodiment of the present disclosure may generate a pitch posture angle control signal, such that the front portion of the vertical take-off/landing aircraft 10 becomes lower than the rear portion as the wind becomes stronger.

The pitch posture angle control signal generated by the flight controller may be transmitted to the auxiliary rotor 300 and used to adjust the pitch posture angle of the vertical take-off/landing aircraft 10. At this time, the pitch posture angle control signal may include at least one of a signal for controlling the number of rotations of the auxiliary rotor 300 and a signal for controlling the collective pitch angle of the auxiliary rotor 300.

In some embodiments, the pitch posture angle control signal generated by the flight controller may be transmitted to the main rotors 200R and 200L instead of the auxiliary rotor 300 and used for controlling the pitch posture angle of the vertical take-off/landing aircraft 10. At this time, the pitch posture angle control signal may include at least one of a signal for controlling the cyclic pitch angle of the main rotors 200R and 200L and a signal for controlling the angle of the vane control surface of the main rotors 200R and 200L.

The flight controller 100 according to an embodiment of the present disclosure may determine the tilt angle of the main rotors 200R and 200L with reference to the above-stated first pitch posture angle and generate a tilt angle control signal for the main rotors 200R and 200L based on the determined tilt angle. Of course, the generated tilt angle control signal for the main rotor may be transmitted to the main rotors 200R and 200L and used for controlling the tilt angle of the main rotors 200R and 200L. More detailed descriptions thereof will be given below with reference to FIGS. 4A and 4B again.

FIGS. 4A and 4B are diagrams for describing a method, performed by the flight controller 100, of tilting a main rotor 200R in various environments, according to an embodiment of the present disclosure.

For convenience of explanation, descriptions will be given below under an assumption that the vertical take-off/landing aircraft 10 is hovering for landing as shown in FIG. 3 and the heading direction of the vertical take-off/landing aircraft 10 is opposite to traveling directions of head winds 500A and 500B against the vertical take-off/landing aircraft 10. Also, it is assumed that head wind 500B of FIG. 4B is stronger than head wind 500A of FIG. 4A.

Referring to FIG. 4A under the above-described assumption, the flight controller 100 according to an embodiment of the present disclosure may control the auxiliary rotor 300, such that the nose of the vertical take-off/landing aircraft 10 descends to maintain a hovering state against the head wind 500A.

At this time, the flight controller 100 may increase the number of rotations of the auxiliary rotor 300 or the collective pitch angle to increase thrust 310A generated by the auxiliary rotor 300, and thus, the vertical take-off/landing aircraft 10 may have a pitch posture angle 420A.

Moreover, as described above, the flight controller 100 according to an embodiment of the present disclosure may tilt the main rotor 200R, such that the rotation axis of the main rotor 200R becomes more parallel to the ground as the pitch posture angle 420A changing in the direction in which the nose of the vertical take-off/landing aircraft 10 descends increases.

In other words, the flight controller 100 according to an embodiment of the present disclosure may control (a tilt angle 411A of the main rotor 200R, such that a tilt angle 411A decreases as the pitch posture angle 420A increases. At this time, the tilt angle 411A may refer to an angle defined in the direction of the rotation axis vector 410A of the main rotor 200R in the X', Y', and Z' coordinate system as described above with reference to FIG. 1.

The main rotor 200R may generate thrust 210RA according to the changed tilt angle 411A, such that the vertical take-off/landing aircraft 10 may stably hover.

On the other hand, referring to FIG. 4B in contrast to FIG. 4A, the flight controller 100 according to an embodiment of the present disclosure may control the auxiliary rotor 300, such that the nose of the vertical take-off/landing aircraft 10 is further lowered to maintain a hovering state against stronger head wind 500B.

At this time, the flight controller 100 may increase the number of rotations of the auxiliary rotor 300 or the collective pitch angle to increase thrust 310B generated by the auxiliary rotor 300 more than the thrust 310A of FIG. 4A, and thus, the vertical take-off/landing aircraft 10 may have a greater pitch posture angle 420B.

Moreover, as described above, the flight controller 100 according to an embodiment of the present disclosure may tilt the main rotor 200R, such that the rotation axis of the main rotor 200R becomes more parallel to the ground as the pitch posture angle 420A changing in the direction in which the nose of the vertical take-off/landing aircraft 10 descends increases.

In other words, the flight controller 100 according to an embodiment of the present disclosure may control a tilt angle 411B of the main rotor 200R, such that a tilt angle 411B decreases as the pitch posture angle 420B increases. At this time, the tilt angle 411B may refer to an angle defined in the direction of the rotation axis vector 410B of the main rotor 200R in the X', Y', and Z' coordinate system as described above with reference to FIG. 1.

The main rotor 200R may generate thrust 210RB according to the smaller tilt angle 411B, such that the vertical take-off/landing aircraft 10 may stably hover against the strong head wind 500B.

The flight controller 100 according to an embodiment of the present disclosure may perform the operations described with respect to FIGS. 4A and 4B only when the speed of the vertical take-off/landing aircraft 10 is less than or equal to a predetermined critical speed. In other words, when it is necessary for the vertical take-off/landing aircraft 10 to maintain a constant flight position for take-off or landing or to fly at a desired speed, the flight controller 100 according to an embodiment of the present disclosure may generate tilt angle control signals for main rotors in correspondence to a vertical posture control signal.

Also, the flight controller 100 according to an embodiment of the present disclosure may also perform the controls according to the descriptions given above with reference to FIGS. 4A and 4B with respect to a left main rotor 200L.

On the other hand, according to the method of controlling the vertical take-off/landing aircraft 10, wherein the method is performed by the flight controller 100 according to an embodiment of the present disclosure, after a tilt angle control signal for the main rotors 200R and 200L as described above is generated, a correcting signal including a tilt angle correcting angle for the main rotors 200R and 200L may be generated based on pre-set aircraft speed-main rotor tilt angle mapping data.

In the present disclosure, the 'tilt angle correcting angle' may refer to an angle for correcting a tilt angle calculated by the flight controller 100 through the above-described process. Also, the 'aircraft speed-main rotor tilt angle mapping data' may refer to data including a tilt angle of the main rotors 200R and 200L at each speed of an aircraft. More detailed descriptions thereof will be given below with reference to FIGS. 5A and 5B again.

FIG. 5A is a diagram showing an example of aircraft speed-main rotor tilt angle mapping data 610A according to an embodiment of the present disclosure.

The flight controller 100 according to an embodiment of the present disclosure may check the speed of the vertical take-off/landing aircraft 10 and determine a tilt angle of the main rotors 200R and 200L at the corresponding speed with reference to the aircraft speed-main rotor tilt angle mapping data 610A. For example, when the speed of the vertical take-off/landing aircraft 10 is 0 km/h, the flight controller 100 may determine 90 degrees as the tilt angle of the main rotors 200R and 200L.

Subsequently, the flight controller 100 according to an embodiment of the present disclosure may compare the tilt angle of the main rotors 200R and 200L according to the aircraft speed-main rotor tilt angle mapping data 610A with a current tilt angle of the main rotors 200R and 200L and calculate a difference angle therebetween. Also, the flight controller 100 may generate a correcting signal including a tilt angle correcting angle for the main rotors 200R and 200L based on the difference angle.

For example, as in the above-stated example, when there is no wind and the inertial speed of the vertical take-off/landing aircraft 10 is 0 km/h, the flight controller 100 may determine 90 degrees as the appropriate tilt angle of the main rotors 200R and 200L. However, when wind blows, a tilt instruction is generated by a pitch posture angle instruction to maintain a hovering position, and an actual (current) tilt angle of the main rotors 200R and 200L is 80 degrees, the flight controller 100 may generate a correcting signal that utilizes 10 degrees, which is a difference angle between the tilt angle according to the aircraft speed-main rotor tilt angle mapping data 610A and the actual tilt angle, as a correcting angle. However, because tilt angles of the main rotors 200R and 200L according to the above-stated aircraft speed-main rotor tilt angle mapping data 610A are only based on cases without wind, the tilt angles of the main rotors 200R and 200L according to the aircraft speed-main rotor tilt angle mapping data 610A may not be suitable for the vertical take-off/landing aircraft 10 when wind blows.

Therefore, when the flight controller 100 according to an embodiment of the present disclosure obtains an aircraft steering signal for changing the pitch posture angle of the vertical take-off/landing aircraft 10 in the direction of lowering the nose of the vertical take-off/landing aircraft 10 by a second pitch posture angle to offset the influence caused by the wind, the flight controller 100 may update aircraft speed-main rotor tilt angle mapping data, such that a tilt correcting angle for the main rotors 200R and 200L, which is corrected according to a tilt angle correcting signal, decreases based on a current speed of the vertical take-off/landing aircraft 10 and a current tilt angle of the main rotors 200R and 200L.

FIG. 5B is a diagram showing an example of aircraft speed-main rotor tilt angle mapping data 610B updated by the flight controller 100 according to an embodiment of the present disclosure.

As described above, tilt angles of the main rotors 200R and 200L of the vertical take-off/landing aircraft 10 according to the aircraft speed-main rotor tilt angle mapping data 610A are related to inertial speeds that do not take the influence of the wind into account. Therefore, when wind blows, the vertical take-off/landing aircraft 10 may be pushed in the direction in which the wind blows and its position may be changed.

Therefore, when an aircraft steering signal for changing the pitch posture angle of the vertical take-off/landing aircraft 10 by a second pitch posture angle in the direction in which the nose of the vertical take-off/landing aircraft 10 is lowered is obtained, the flight controller 100 according to an embodiment of the present disclosure may update aircraft speed-main rotor tilt angle mapping data, such that a tilt angle correcting angle for the main rotors 200R and 200L, which is compensated for according to a correcting signal for the tilt angle, decreases based on a current speed of the vertical take-off/landing aircraft 10 and a current tilt angle of the main rotors 200R and 200L, like the aircraft speed-main rotor tilt angle mapping data 610B shown in FIG. 5B.

For example, when the vertical take-off/landing aircraft 10 maintains a hovering position in a windy environment, the flight controller 100 may determine 90 degrees as the appropriate tilt angle of the main rotors 200R and 200L with reference to the aircraft speed-main rotor tilt angle mapping data 610A.

However, when a pitch posture instruction is generated to maintain a current position against the wind, a tilt angle instruction is generated thereby, and the tilt angle of the main rotors 200R and 200L is 80 degrees, and the flight controller 100 may generate a correcting signal that utilizes 10 degrees, which is a difference angle between the tilt angle according to the aircraft speed-main rotor tilt angle mapping data 610A and the actual tilt angle, as a correcting angle. Furthermore, the flight controller 100 may maintain the tilt angle of the main rotors 200R and 200L to be 80 degrees according to the correcting signal, and thus, the vertical take-off/landing aircraft 10 may maintains its position and hover even in a windy environment.

In other words, tilt angles of the main rotors 200R and 200L according to the aircraft speed-main rotor tilt angle mapping data 610A are defined without taking air speeds due to wind into account. Therefore, when wind blows around the vertical take-off/landing aircraft 10, the tilt angles of the main rotors 200R and 200L according to the aircraft speed-main rotor tilt angle mapping data need to be suitably adjusted according to a correcting signal.

Therefore, when an aircraft steering signal for changing the pitch posture angle of the vertical take-off/landing aircraft 10 by a second pitch posture angle in the direction in which the nose of the vertical take-off/landing aircraft 10 is lowered is obtained, the flight controller 100 according to an embodiment of the present disclosure may update aircraft speed-main rotor tilt angle mapping data, such that a tilt angle correcting angle for the main rotors 200R and 200L, which is compensated for according to a correcting signal for the tilt angle, decreases (e.g., the tilt angle correcting angle becomes 0 degrees) based on a current speed of the vertical take-off/landing aircraft 10 and a current tilt angle of the main rotors 200R and 200L, like the aircraft speed-main rotor tilt angle mapping data 610B.

For example, it may be seen that, when the speed of the vertical take-off/landing aircraft 10 is 15 km/h, a tilt angle according to first mapping data 610A is approximately 90 degrees, whereas a tilt angle according to second mapping data 610B is approximately 70 degrees. In other words, when wind is blowing around the vertical take-off/landing aircraft 10, the tilt angle of the main rotors 200R and 200L may be less than the tilt angle of the main rotors 200R and 200L in a case where there is no wind.

Accordingly, according to the present disclosure, an instruction for tilting the main rotors 200R and 200L may be automatically generated based on a vertical posture control signal under a low-speed flight condition where it is difficult to directly measure a wind speed. Therefore, the tilt angle of the main rotors 200R and 200L may be actively compensated for according to changes of the air speed due to wind.

The embodiments according to the present disclosure described above may be implemented in the form of a computer program that may be executed through various components on a computer, and such a computer program may be recorded on a computer-readable recording medium. At this time, the medium may be to store a program executable by a computer. Examples of the medium include magnetic media, such as a hard disk, a floppy disk, and magnetic tape, optical recording media, such as CD-ROMs and DVDs, magneto-optical media such as a floptical disk, and ROM, RAM, and a flash memory, which are configured to store program instructions.

Moreover, the computer program may be specially designed and configured for the present disclosure or may be known and available to one of ordinary skill in the computer software field. Examples of computer programs may include machine language code such as code generated by a compiler, as well as high-level language code that may be executed by a computer using an interpreter or the like.

Particular implementations described in the disclosure are merely embodiments and do not limit the scope of the disclosure in any way. For brevity of description, descriptions of conventional electronic configurations, control systems, software, and other functional aspects of the systems may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Also, unless specifically mentioned as "essential," "important," components may not be necessary components for the application of the present disclosure.

Therefore, the spirit of the disclosure should not be limited to the above-described embodiments, and the scope of the spirit of the disclosure is defined not only in the claims below, but also in the ranges equivalent to or equivalent to the claims.

The invention claimed is:

1. A vertical take-off/landing aircraft comprising:
   at least one main rotor operable to rotate along a rotation axis vector and generate first thrust of the vertical take-off/landing aircraft;
   an auxiliary rotor operable to rotate and generate second thrust of the vertical take-off/landing aircraft; and
   a flight controller communicatively coupled to the at least one main rotor and the auxiliary rotor and including a processor and a memory that stores executable instructions that, when executed by the processor, facilitate performance of operations, the operations comprising;
   receiving from a user terminal or generating according to a pre-set flight schedule, an aircraft steering signal for steering the vertical take-off/landing aircraft;
   wherein the aircraft steering signal includes a vertical posture control signal that changes a pitch posture angle of the vertical take-off/landing aircraft by a first pitch posture angle;
   wherein the pitch posture angle is indicative of a degree to which the vertical take-off/landing aircraft is inclined with respect to a ground;
   determining a title angle of the at least one main rotor relative to the rotation axis vector with reference to the first pitch posture angle;
   generating a tilt angle control signal for the at least one main rotor based on a determined tilt angle;
   causing the at least one main rotor to change the tilt angle based on the tilt angle control signal;
   generating a pitch posture angle control signal based on the aircraft steering signal; and
   causing the auxiliary rotor to change the pitch posture angle based on the pitch posture angle control signal.

2. The vertical take-off/landing aircraft of claim 1, wherein the tilt angle control signal corresponds to the vertical posture control signal for changing the pitch posture angle by the first pitch posture angle when a speed of the vertical take-off/landing aircraft is less than or equal to a predetermined critical speed.

3. The vertical take-off/landing aircraft of claim 1, wherein a heading direction of the vertical take-off/landing aircraft and a traveling direction of head wind against the vertical take-off/landing aircraft are opposite to each other.

4. The vertical take-off/landing aircraft of claim 3, wherein in response to a strength of the head wind, the pitch posture angle increases in a direction in which a nose of the vertical take-off/landing aircraft descends.

5. The vertical take-off/landing aircraft of claim 4, wherein the operations further comprise generating a control signal for tilting the at least one main rotor, such that the rotation axis vector of the at least one main rotor becomes parallel to the ground, as the pitch posture angle increases in the direction in which the nose of the vertical take-off/landing aircraft descends.

6. The vertical take-off/landing aircraft of claim 4, wherein the pitch posture angle and the tilt angle of the at least one main rotor are in a linear relationship or a non-linear relationship.

7. The vertical take-off/landing aircraft of claim 1, wherein the operations further comprise generating a correction signal that corrects the determined tilt angle of the at least one main rotor based on pre-set aircraft speed-main rotor tilt angle mapping data.

8. The vertical take-off/landing aircraft of claim 7, wherein the operations further comprise updating the pre-set aircraft speed-main rotor tilt angle mapping data, such that the determined tilt angle is corrected to decrease based on a current speed of the vertical take-off/landing aircraft and a current tilt angle of the at least one main rotor.

9. The vertical take-off/landing aircraft of claim 7, wherein the causing the at least one main rotor to change the tilt angle based on the tilt angle control signal further comprises causing the at least one main rotor to change the tilt angle with reference to the first pitch posture angle and a decreased tilt angle.

10. The vertical take-off/landing aircraft of claim 1, wherein the pitch posture angle control signal comprises at least one of a signal for controlling a number of rotations of the auxiliary rotor and a signal for controlling a collective pitch angle of the auxiliary rotor.

11. The vertical take-off/landing aircraft of claim 1, wherein the pitch posture angle control signal comprises a signal for controlling a cyclic pitch angle of the at least one main rotor.

12. The vertical take-off/landing aircraft of claim 1, wherein the pitch posture angle control signal comprises a signal for controlling an angle of a vane control surface of the at least one main rotor.

13. A method of controlling a vertical take-off/landing aircraft comprising:
  obtaining, by a flight controller comprising a processor, an aircraft steering signal comprising a vertical posture control signal for changing a pitch posture angle of the vertical take-off/landing aircraft by a first pitch posture angle;
  generating, by the flight controller, a pitch posture angle control signal for changing a pitch posture angle of the vertical take-off/landing aircraft based on the vertical posture control signal included in the aircraft steering signal; and
  determining, by the flight controller, a tilt angle of a main rotor with reference to the first pitch posture angle; and
  generating, by the flight controller, a tilt angle control signal for the main rotor based on the determined tilt angle.

14. The method of claim 13, wherein the tilt angle control signal for the main rotor corresponds to the vertical posture control signal for changing the pitch posture angle by the first pitch posture angle when a speed of the vertical take-off/landing aircraft is less than or equal to a predetermined critical speed.

15. The method of claim 13, further comprising, after the generating of the tilt angle control signal of the main rotor, generating, by the flight controller, a correcting signal that corrects the determined tilt angle for the main rotor based on pre-set aircraft speed-main rotor tilt angle mapping data.

16. The method of claim 15, further comprising controlling, by the flight controller, the tilt angle of the main rotor with reference to the first pitch posture angle and a corrected tilt angle.

17. The method of claim 13, wherein the pitch posture angle control signal comprises at least one of a signal for controlling a number of rotations of an auxiliary rotor and a signal for controlling a collective pitch angle of the auxiliary rotor.

18. The method of claim 13, wherein the pitch posture angle control signal comprises a signal for controlling a cyclic pitch angle of the main rotor.

19. The method of claim 13, wherein the pitch posture angle control signal comprises a signal for controlling an angle of a vane control surface of the main rotor.

20. A non-transitory, machine-readable medium, comprising executable instructions that, when executed by a flight controller including a processor, facilitate performance of operations, the operations comprising:
  obtaining an aircraft steering signal comprising a vertical posture control signal for changing a pitch posture angle of a vertical take-off/landing aircraft by a first pitch posture angle;
  generating a pitch posture angle control signal for changing the pitch posture angle of the vertical take-off/landing aircraft based on the vertical posture control signal included in the aircraft steering signal;
  determining a tilt angle of the main rotor with reference to the first pitch posture angle; and
  generating a tilt angle control signal for the main rotor based on the determined tilt angle.

* * * * *